Figure 1:
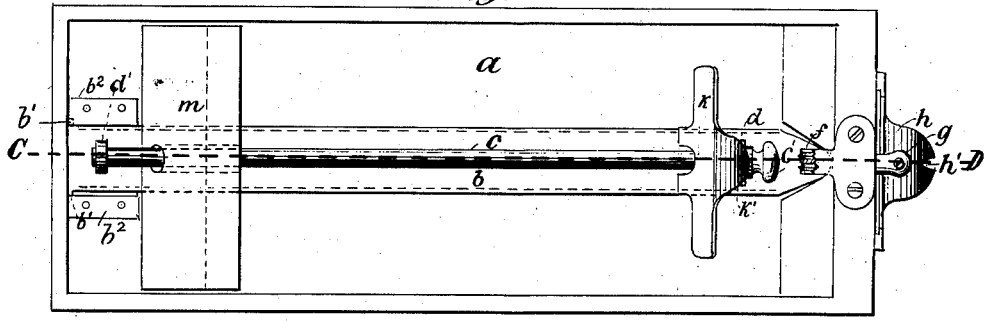

No. 846,488. PATENTED MAR. 12, 1907.
W. LIVINGSTONE.
RECEPTACLE FOR CARD INDEXES.
APPLICATION FILED MAR. 9, 1906.

3 SHEETS—SHEET 1.

WITNESSES:

INVENTOR
William Livingstone
BY
ATTORNEY

No. 846,488. PATENTED MAR. 12, 1907.
W. LIVINGSTONE.
RECEPTACLE FOR CARD INDEXES.
APPLICATION FILED MAR. 9, 1906.

3 SHEETS—SHEET 2.

WITNESSES:

INVENTOR
William Livingstone
BY
ATTORNEY

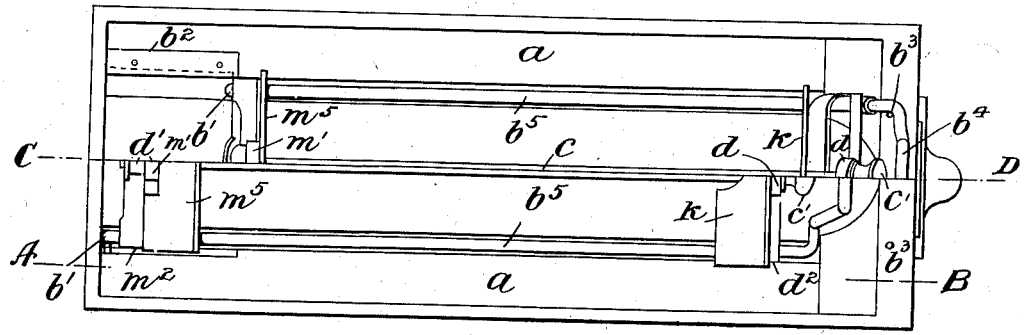
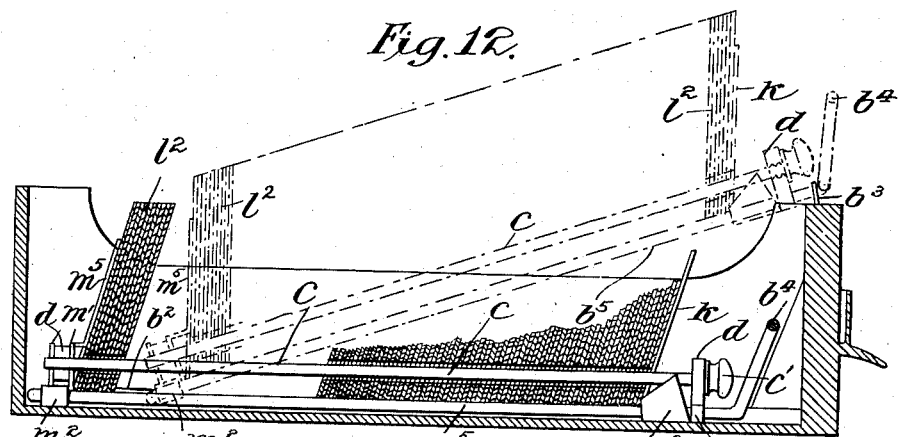
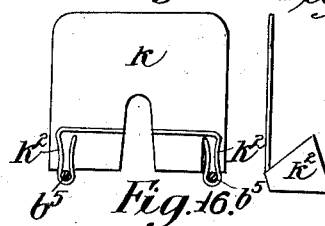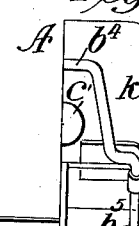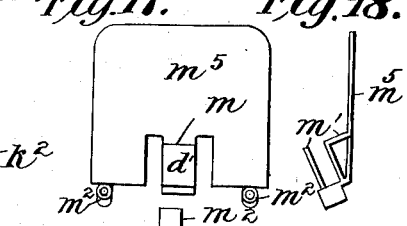
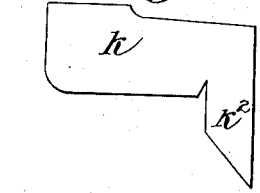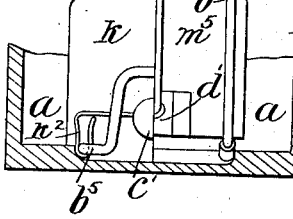

UNITED STATES PATENT OFFICE.

WILLIAM LIVINGSTONE, OF NEW YORK, N. Y.

RECEPTACLE FOR CARD-INDEXES.

No. 846,488.  Specification of Letters Patent.  Patented March 12, 1907.

Application filed March 9, 1906. Serial No. 305,044.

*To all whom it may concern:*

Be it known that I, WILLIAM LIVINGSTONE, a citizen of the United States, residing at New York, Flushing, in the county of Queens and State of New York, have invented a new and useful Improvement in Receptacles for Card-Indexes, of which the following is a specification.

My invention relates to improvements in card-index-filing devices.

Card-index-filing devices now in use have certain features in common—to wit, the box, the rod passing through the front of the box and through the perforated cards to the rear of the box, and a movable follower on the rod to hold the cards together, be they few or many. A knob on the rod on the outside of the box is sometimes used as a handle by which the box is removed from or replaced in the cabinet; but most have a separate handle for that purpose, and in large public libraries the boxes show the printed notice to remove the same by the handle and support the weight of the box with the other hand, implying thereby that the use of the knob is forbidden as unreliable and unsafe.

The objects of my invention are, first, to remove the rod and its knob from the outside to the inside of the box, making it absolutely impossible to be used as a handle; second, to effect the withdrawal of the rod from its supports and from the cards for the purpose of taking some of them out or putting others in or changing their places, not through the front of the box, but by raising the cards and rod at the forward end above the upper edges of the front of the box; third, to produce an absolutely perpendicular position of the cards to the bottom of the box when the card-support and rod are raised at their forward end above the upper edge of the front of the box, incidentally raising each card a little above the other next behind and facilitating their separation from each other when by atmospheric or digital moisture they are apt to be pulpy and stick together, and, fourth, to accomplish these objects by a mechanism simple and cheap in construction and readily to be attached to boxes now in use without damaging their structural efficiency or disfiguring their appearance.

In the drawings attached to this specification I have illustrated a card-index-filing device embodying my invention, which will be fully described hereinafter and its novel features pointed out in the claims.

Figure 2:
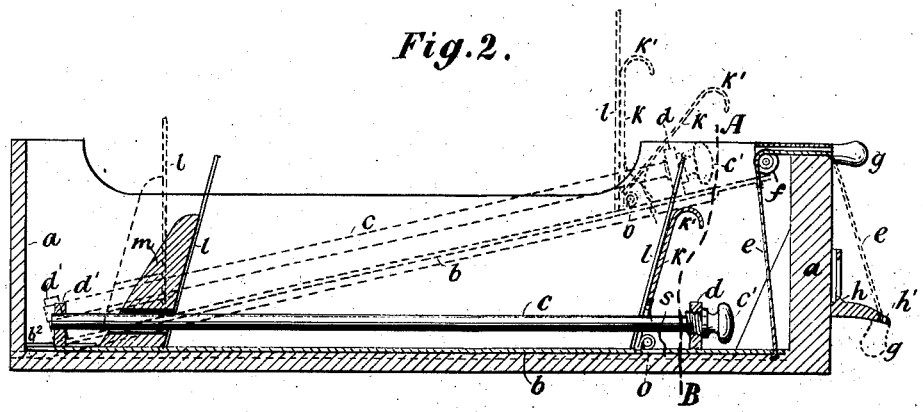
Figure 3:
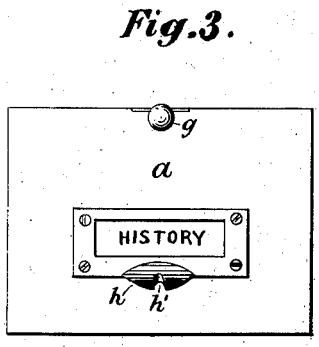
Figure 4:
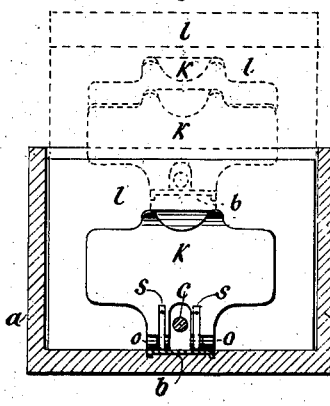
Figure 5:
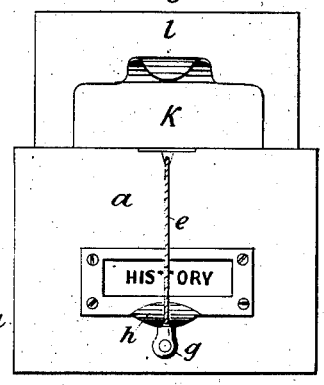
Figure 6:
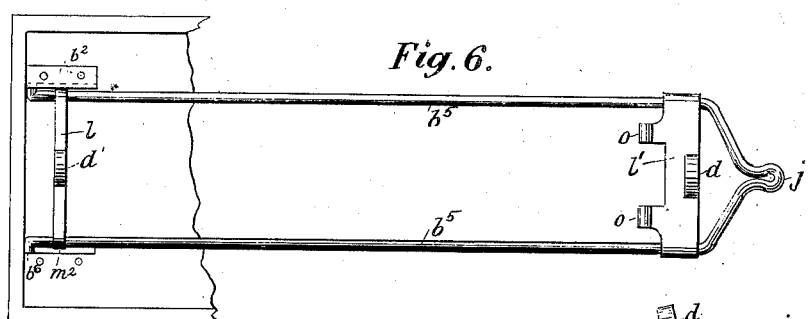
Figure 7:
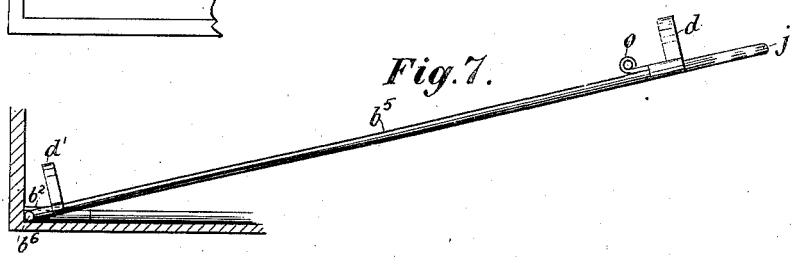
Figure 8:
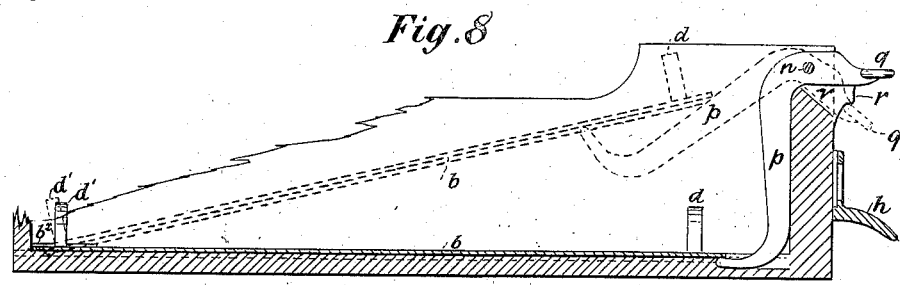
Figure 9:
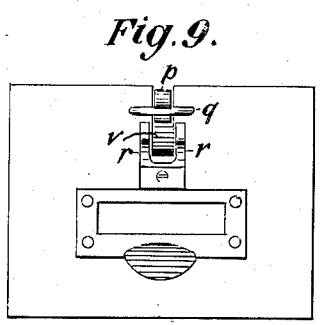
Figure 10:
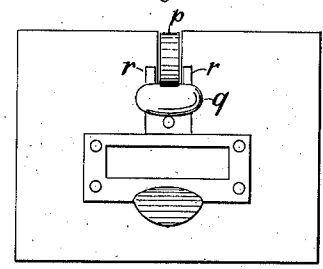

Figure 1 is a plan view of the box with filing device in its normal position when not in use. Fig. 2 is a longitudinal section of box through line C D of Fig. 1, showing in full black lines the filing device in the same position as in Fig. 1 and in broken lines in position for use and also with the movable front rest-plate thrown forward to facilitate the reading of the cards. Fig. 3 is a front view of the box when in the cabinet and not in use. Fig. 4 is a transverse section of the box and filing device through line A B of Fig. 2, showing in full black lines the filing device when not in use and in broken lines in position for use and the movable front rest-plate thrown forward for the easier reading of the cards. Fig. 5 is a front view of the box when out of the cabinet and ready for use, with the movable front facing-plate in its normal position and not thrown forward. Fig. 6 is a plan view of the card-rest substituting twin wire rods for a flat strip for the purpose of providing a larger bearing-surface for the cards without any increase of weight. Fig. 7 is an elevation of the same when the forward end is raised. Fig. 8 is a longitudinal section of a modification for raising the card-rest by a lever instead of a cord and showing in full black lines card-rest and rod in normal position when not in use and in broken lines when the forward end is raised for use. Fig. 9 is a front view of the box, showing the thumb-plate of the lever of said modification in its position when not in use. Fig. 10 is a front view of the box with said modification, showing the thumb-plate depressed when the other end of the lever inside the box has raised the forward end of the card-rest for use. Fig. 11 is a plan view of yet another modification of my invention in which the forward end of the card-rest is raised in the most direct manner to the top of the front of the box without the intermediate action of either cord or pulley or lever and showing one longitudinal half of the device resting upon the bottom of the box not in use and the other raised to the top of the front of the box ready for use. Fig. 12 is a compromise longitudinal section through lines A B and C D, Fig. 11, showing one-half of said modification when not in use and the other half raised at its forward end to the top of the box and drawn in both positions in full black lines. Fig. 13 is a front view of said modified device, showing the front of the box removed and one half of the device in its normal position and the other half raised at its forward end to the height of the box. Fig. 14 is a front view. Fig. 15 is a side view of the movable front facing-plate; Fig. 16, a plan view of a suitable blank from which it may be formed. Fig. 17 is a front view; Fig. 18, a side view of the immovable rear facing-plate, and Fig. 19 a plan view of a suitable blank from which it may be formed.

Similar letters of reference designate corresponding parts in all the figures.

In the construction of my filing device, $a$ represents the box. $b$, Figs. 1, 2, 4, and 8, is a strip of sheet metal of suitable width and thickness and of a length slightly less than the inside length of the box. Its longitudinal edges are bent downward to give it greater stiffness. At its extreme rear end it has two lateral projections $b'$ $b'$, and its normal place in the box is in a central slot or groove in the bottom of the box. This central groove is somewhat widened for a short distance from the rear end of the box to permit the lateral projections $b'$ $b'$ to be housed therein, and when covered by the strips $b^2$ they will be susceptible to a forward-and-backward motion only without losing their contact with the bottom of the box. (See Figs. 1, 2, and 8.) In lieu of this strip $b$ stiff-wire twin rods $b^5$ $b^5$ may be used for the purpose of enlarging the bearing-surface of the cards without increase of the weight of the card-rest and to avoid a weakening of the bottom of the box by too wide a slot or groove. In this case the ends $b^6$ $b^6$ of the twin rods will be bent outward at right angles to their longitudinal direction to produce the lateral projections resting in suitable recesses provided in the bottom of the box and similarly guarded by plates $b^2$ $b^2$ against any vertical displacement. (See Figs. 6, 7, 11, 12, and 13.)

Near to the front and rear ends of the strip $b$ or twin rods $b^5$ $b^5$ and suitably fixed thereto are the supports $d$ and $d'$, through which passes the rod $c$, being screwed into the support $d$ up to the face of the knob $c'$ and loosely guided in the support $d'$. (See Figs. 1, 2, 11, and 12.) To the extreme forward end of the strip $b$ is suitably attached a piece of cord, catgut, flexible wire, chain, or other suitable substance $e$, which is carried over a roller $f$ at the upper end and near the inner side of the box $a$ and fastened by means of a set-screw or in any suitable manner inside of the knob $g$ and close to the outside of the box. (See Figs. 1, 2, and 3.)

The handle $h$ at the front of the box is so placed that the distance from the center of the knob $g$ at its point of contact with the front of the box to the extreme edge of the handle $h$ shall be equal to the length of the cord $c$ from the upper side of the strip $b$ to the low bottom of the roller $f$. The handle $h$ has at its extreme edge a slit $h'$ a little wider and a little longer than the thickness of the cord $e$, which can be inserted and held therein by the knob $g$. (See Figs. 1, 2, and 3.)

A short distance back of the rod-support $d$ the strip $b$ or twin rods $b^5$ $b^5$, forming the card-rest, carries the front facing-plate $k$ by means of the hinge $o$ in such a manner that normally it will stand to the strip $b$ or the twin rods $b^5$ $b^5$, forming the card-rest, at an angle of ninety degrees plus the angle of the strip $b$ (when raised) to the bottom of the box, while the hinge $o$ will permit a limited forward declination of the front face-plate $k$ by the finger-piece $k'$ to facilitate the reading of the cards, in either of which positions it will be held securely by springs $s$ $s$, and an opening provided in the lower end of the front facing-plate $k$ will permit the rod $c$ to pass through it at whatever angle it may be placed Figs. 2 and 4.

Between the front facing-plate and the rear rod-support $d'$ is the usual sliding block $m$ for closing or extending the space containing the cards and holding them together, be they few or many. The face of this sliding block $m$ is permanently parallel to the front facing-plate $k$ in its normal position—that is to say, it stands to the strip $b$ or the twin rods $b^5$ $b^5$, forming the card-rest, at an angle supplementary to the angle of the front facing-plate $k$, Fig. 2. The function of the front facing-plate $k$ and the rear sliding block $m$ may be advantageously reversed—that is to say, the sliding block $m$ or its substitute, a rear facing-plate $m^5$, may be attached to the card-rest in a permanently-fixed position at the same angle and the front facing-plate $k$ made longitudinally movable, besides retaining its limited angular declination by means of gradually-elongated bearings $k^2$ $k^2$, which at one end are perfectly circular to fit the twin rods $b^5$ $b^5$ and at the other end sufficiently elongated that the front facing-plate $k$ in its normal position will have the whole circular opening and the lower edge of the elongated bearings in contact with the twin rods $b^5$ $b^5$, and when the front facing-plate $k$ is pulled forward to its inclined position the circular opening and the upper line of the elongated bearings will come in contact with the twin rods $b^5$ $b^5$. Moreover, these flattened conical bearings $k^2$ $k^2$ have on the inward side near the top an open seam, and in their elongated sides a slight inward depression, which will act as a spring and hold the front facing-plate firmly in either positions, Figs. 11, 12, 13, 14, and 15.

In the modification shown in Figs. 6 and 7 the twin rods $b^5$ $b^5$ being made from a single rod, form at their forward end a loop $j$, in which the cord $e$ or its preferred substitute may be suitably fixed, and their parallelism toward each other will be fully secured by the connecting-plates $l\ l'$, which are in themselves or carry the rod-supports $d\ d'$.

In the modification as represented in Figs. 8, 9, 10, $p$ is a two-armed lever having its fulcrum $n$ in the slanting slot $v$ in the upper end of the front of the box $a$. The shorter arm of this lever when not in use stands straight out from the slot and has a thumb-plate $q$ at its end and outside of the front of the box. The other arm of the lever is inside of the box and extends downward close to the front of the box, with its taper end curved backward to rest with its extreme point beneath the end of strip $b$ or the connecting-plate $l$ of the twin rods $b^5\ b^5$, which carries the rod-support $d$. Beneath the slanting slot $v$ and above the handle $h$ is the forked spring $r\ r$, as shown in full black lines. When preparing for use, a moderate pressure upon the thumb-plate $q$ will depress the short arm of the lever toward the bottom of the slanted slot $v$, while the inner and longer arm will raise the strip $b$ or the twin rods $b^5\ b^5$ to the desired height, as shown in dotted lines, Fig. 8, and the forked spring $r$, with suitable depressions, will hold the thumb-plate down until relieved by upward pressure.

In the modification shown in Figs. 11, 12, 13, 14, 15, 16, 17, 18, and 19 it is designed to lift the forward end of the card-rest direct without the intermediate action of a lever or roller and cord. For this purpose the twin rods $b^5\ b^5$ are bent at their forward ends at right angles toward each other for a short distance, then upward to about half the height of the box, and inward again toward each other, forming there (as the twin rods $b^5\ b^5$ are made from a single piece of wire) a transverse horizontal member $b^4$ of and integral with the twin rods $b^5\ b^5$, so located about midway between the bottom and top of the box as to be easily grasped between the thumb and forefinger and lifted to its desired position above the top of the box. The lower horizontal bends of the twin rods $b^5\ b^5$ are fitted with hooks $b^3\ b^3$ to hold the card-rest when lifted to the desired position above the top of the box. The hooks are connected with the horizontal bends by bending the ends into loops which are less than complete circles, so that they spring over the transverse members and partly encircle the same, whereby they are clasped on the said members. The other ends of the hooks are bent so that they project below the top of the box on the outside and hook the card-rest and the top when it is lifted and drawn back until its end rests on top of the box, as shown by Fig. 12.

It will be seen that in my invention and all its modifications the rod $c$, securely screwed into the support $d$ and loosely carried in support $d'$, will at all times and under all circumstances be inside of the box and absolutely invisible from the front. The angular lateral projections $b'\ b'$ of the card-rest $b$ or the outwardly-bent ends $b^6\ b^6$ of the twin rods $b^5\ b^5$, slidable in their proper recesses, permit the card-rest and rod $c$ to be raised and lifted at its forward end in any direction without additional lengthening provision when desired to bring the card-rest in contact with the upper edge of the front of the box, which would be absolutely necessary if the card-rest was secured to the rear end of the box by a fixed hinge.

The normal position of the front facing-plate $k$, whether movable or fixed at an angle to the card-rest of ninety degrees plus the angle of the card-rest (when raised) to the bottom of the box and the position of the rear sliding block $m$ or of its substitute, a fixed rear facing-plate $m^3$ parallel to it, will naturally confine the cards $l^2\ l$ between them to a permanently-oblique position to the card-rest, while when the card-rest is raised the position of the cards to the bottom of the box will be absolutely perpendicular.

The forward-declining feature of the front facing-plate $k$ by either the hinges $o$ or the elongated conical bearings $k^2$ has the advantage of allowing the cards to be more closely held together and yet have sufficient space to turn them over for reading them successively.

The substitution of a fixed rear facing-plate for the present sliding block, which takes about one inch of the length of the box, will permit a greater number of cards to be placed in a box.

I claim as my invention—

1. A receptacle for card-indexes comprising the combination with a receptacle, of a card-rest, a guide-rod to engage the cards, a front facing-plate and a rear follower to hold the cards together, one of which is supported on the card-rest and the other movably connected with the guide-rod, all of which said parts when in their normal position inclosed within and resting upon the bottom of the receptacle, but capable of being raised at the forward end of the receptacle to the desired height the said rod being confined within the receptacle and protected against being used as a handle, substantially as specified.

2. In a receptacle for card-indexes, the combination with a receptacle having lateral slots at the rear end, of a card-rest provided with pivotal projections which engage the said slots, a guide-rod mounted thereon, said card-rest adapted to be moved horizontally and lifted at the forward end to carry the cards to or above the top of the box, a front facing-plate and a rear follower to hold the cards together, one of which is supported on the card-rest and the other movably connected with the guide-rod, said parts in their normal position inclosed within and resting upon the bottom of the receptacle and capable of being raised at the forward end of the receptacle to the desired height, the said rod being confined within the receptacle and protected against being used as a handle, substantially as specified.

3. In receptacles for card-indexes a card-receptacle, a card-rest slidably connected at one end with the receptacle and adapted to be moved longitudinally and at the opposite end capable of being lifted, and a rod to engage the cards and connect them with the support, substantially as specified.

4. In receptacles for card-indexes a card-receptacle, a card-rest slidably connected therewith at one end and adapted to be lifted to raise and sustain the cards above the top of the receptacle and to move longitudinally while being lifted, means for holding it in its upper position, and a rod to engage the cards and connect them with the card-support, substantially as specified.

5. In receptacles for card-indexes, a card-receptacle, a card-rest slidably connected therewith at one end and capable of being lifted to raise and sustain the cards above the top of the receptacle, a rod to engage the cards and connect them with the card-rest and a front facing-plate connected with the card-rest to hold the cards normally in an oblique position with respect to the card-rest, substantially as specified.

6. In receptacles for card-indexes, a card-receptacle, a card-rest slidably connected therewith at one end and capable of being lifted to raise and sustain the cards above the top of the receptacle, a rod to engage the cards and connect them with the card-rest, and a front facing-plate connected with the card-rest to hold the cards normally in an oblique position and adapted to be turned back and hold them in a more oblique position with respect to the card-rest, substantially as specified.

7. In receptacles for card-indexes, a card-receptacle, a card-rest slidably connected therewith at one end and capable of being lifted to raise and sustain the cards above the top of the receptacle and to move longitudinally when lifted, means for lifting the end to its upward position, means for sustaining the end when lifted to its upward position, a rod to engage the cards and connect them with the card-rest, and a front facing-plate connected with the card-rest, substantially as specified.

8. In receptacles for card-indexes a card-receptacle, a card-rest slidably connected therewith at one end and capable of being lifted to raise and sustain the cards above the top of the receptacle and to move longitudinally when lifted, means for sustaining the end when lifted to its upward position, a rod to engage the cards and connect them with the card-rest, a front facing-plate hinged to the card-rest and set normally at an oblique angle to the bottom of the receptacle and the rod but when the card-rest is lifted adapted to be turned back to lessen its inclination to the card-rest and rod, substantially as specified.

9. In receptacles for card-indexes, a card-receptacle, a card-rest slidably connected therewith at one end and capable of being lifted and at the same time to move longitudinally, a rod to engage the cards and connect them with the card-rest, a front facing-plate hinged to the card-rest set normally at an oblique angle to the bottom of the receptacle and the rod, but when the card-support is lifted assuming a position perpendicular to the bottom of the receptacle and adapted to be turned back and held in an inclined position with respect to the card-rest and rod to allow the exposed card to be turned downward and away from the card immediately behind it to fully expose the latter, substantially as specified.

10. In receptacles for card-indexes, a card-receptacle, a card-rest slidably connected therewith at one end and capable of being lifted and to move longitudinally, supports at opposite ends of the card-rest provided with perforations, the perforation in the support at the liftable end of the card-rest being screw-threaded, and a rod to engage the cards and connect them with the card-rest inserted in the said perforations and its end next to the liftable end of the card-rest screwed into the support, substantially as specified.

11. In receptacles for card-indexes, a card-receptacle, a card-rest slidably connected therewith at one end and capable of being lifted at the opposite end, supports at opposite ends of the card-rest, a rod to engage the cards and connect them with the card-rest inserted in the supports and connected therewith in a similar manner said rod inclosed within the receptacle normally where it cannot be gotten at, substantially as specified.

12. In receptacles for card-indexes, a card-receptacle, a card-rest slidably connected therewith at one end and capable of being lifted and to move longitudinally, uprights at opposite ends of the card-rest, a rod connected therewith to engage the cards and connect them with the card-rest, said rod provided with a knob at one end screw-threaded adjacent to the shoulder of the knob and adapted to be inserted in the perforations in the uprights and to make screw connection with the upright adjacent to the liftable end of the card-rest, substantially as specified.

13. In receptacles for card-indexes, a card-receptacle, a card-rest slidably connected therewith at one end and capable of being lifted at the opposite end and to move longitudinally, a rod to engage and connect the cards with the card-rest supported on the card-rest wholly within the receptacle whereby it is concealed when the card-rest and the cards are in their normal position in the receptacle, substantially as specified.

14. In receptacles for card-indexes, a card-receptacle, a card-rest slidably connected therewith at one end and capable of being lifted at the opposite end and at the same time move longitudinally, a rod to engage and connect the cards with the card-rest supported on and connected with the card-rest wholly within the receptacle, a cord connected with the liftable end of the card-rest which extends up to the top of the receptacle and carried over a roller and the top of the receptacle to the outside of the front thereof, means for holding the end of the cord when the card-rest is in its normal position, and means for securing the same to hold and sustain the card-rest when lifted, substantially as specified.

15. In receptacles for card-indexes, a card-rest slidably connected with the receptacle at one end and capable of being lifted at the opposite end and at the same time moved longitudinally, a rod to engage and connect the cards with the card-rest supported on and connected with the card-rest wholly within the receptacle, a cord attached to the liftable end of the card-rest and extended up to the top of the receptacle over a roller and its end carried to the outside of the front thereof, a knob on the end of the cord and a handle on the front of the receptacle provided with a slit to receive the cord and secure it for the purpose of holding the card-rest when lifted, substantially as specified.

16. In receptacles for card-indexes a rectangular box open at the top, a card-rest consisting of a metal strip having lateral projections in its edges at the rear end, grooves in the bottom of the box to receive the said projections and thus slidably connect the rear end of the card-rest with the box while the front end is liftable to the top of the box, a cord having one end connected with the card-rest and the other end carried up to the top of the box and over a roller to the outside of the front, a rod to engage and connect the cards with the card-rest, and means for securing the end of the cord when the card-rest is in its normal position and also when lifted, substantially as specified.

17. In receptacles for card-indexes a rectangular box open at the top, a card-rest consisting of a metal strip having lateral projections on its edges at the rear end, grooves in the bottom of the box to receive the said projections and thus slidably connect the rear end of the card-rest with the box while the front end is liftable to the top of the box, a cord having one end connected with the card-rest and the other end carried up to the top of the box and over a roller to the outside of the front, a rod to engage and connect the cards with the card-rest, a front facing-plate hinged to the card-rest and set normally at an oblique angle thereto, and which when the card-rest is lifted is adapted to be turned back to increase its obliquity to the card-rest, and means for securing the end of the cord when the card-rest is in its normal position and also when it is lifted to the top of the receptacle, substantially as specified.

18. In receptacles for card-indexes, a rectangular box open at the top, a card-rest consisting of a metal strip having lateral projections on its edges at the rear end, grooves in the bottom of the box to receive the said projections and thus slidably connect the rear end of the card-rest with the box while the front end is liftable to the top of the box, a cord having one end connected with the card-rest and the other end carried up to the top of the box and over a roller to the outside of the front, a rod to engage and connect the cards with the card-rest, a front facing-plate hinged to the card-rest and set normally at an oblique angle thereto but when the card-rest is lifted adapted to be turned back to increase its obliquity to the card-rest, substantially as specified.

19. In receptacles for card-indexes, a card-receptacle, a card-rest slidably connected therewith at one end and capable of being lifted to raise and sustain the cards above the top of the receptacle, a rod to engage the cards and connect them with the card-rest, a rear facing-plate and a front facing-plate connected with the card-rest and parallel to each other to hold the cards normally in an oblique position with respect to the card-rest, the front facing-plate adapted to be turned back and hold the cards in a still more oblique position with respect to the card-rest when the latter is lifted, substantially as specified.

In testimony that I claim the invention above set forth I have affixed my signature in presence of two witnesses.

WILLIAM LIVINGSTONE.

Witnesses:
 G. H. D. FOSTER,
 HANS ANNHEIN.